United States Patent [19]

Harigaya et al.

[11] Patent Number: 5,313,305

[45] Date of Patent: May 17, 1994

[54] VIDEO CAMERA HAVING VIEWFINDER AND A POWER SAVING FUNCTION FEATURE

[75] Inventors: Isao Harigaya; Koji Takahashi, both of Kanagawa, Japan

[73] Assignee: Canon Kabushiki Kaishi, Tokyo, Japan

[21] Appl. No.: 720,921

[22] Filed: Jun. 25, 1991

[51] Int. Cl.⁵ .............................................. H04N 5/30
[52] U.S. Cl. .................................. 348/214; 348/333; 348/372; 348/220
[58] Field of Search ............... 358/213.13, 224, 209, 358/909, 906; H04N 5/232

[56] References Cited

U.S. PATENT DOCUMENTS

| | | | |
|---|---|---|---|
| 4,740,828 | 4/1988 | Kinoshita | 358/909 |
| 4,899,231 | 2/1990 | Maeda et al. | 358/906 |
| 4,945,424 | 7/1990 | Hiroki et al. | 358/224 |
| 5,122,880 | 6/1992 | Nagano | 358/909 |

FOREIGN PATENT DOCUMENTS

| | | | |
|---|---|---|---|
| 57-078280 | 5/1982 | Japan | 358/909 |
| 59-033415 | 2/1984 | Japan | 358/224 |
| 59-033416 | 2/1984 | Japan | 358/224 |
| 2311833 | 12/1990 | Japan | 558/909 |

*Primary Examiner*—Michael T. Razavi
*Assistant Examiner*—Wendy R. Greening
*Attorney, Agent, or Firm*—Robin, Blecker, Daley & Driscoll

[57] ABSTRACT

In a video camera having an image sensor for converting an object image into a video signal, a viewfinder for visualizing the object image and a power source, waste of electric energy is prevented by controlling the supply of power to the viewfinder by detecting the access or non-access of the eye of a photographer to the viewfinder. Waste of electric energy is further prevented by controlling the power supply to the image sensor by detecting the state of the access of the eye to the viewfinder. In a case where the video camera is provided with a recorder for recording the video signal on a recording medium, waste of the recording medium is prevented by detecting the access or non-access of the eye to the viewfinder and by inhibiting a recording action of the recorder according to the result of detection, so that unintended meaningless shooting can be prevented.

15 Claims, 6 Drawing Sheets

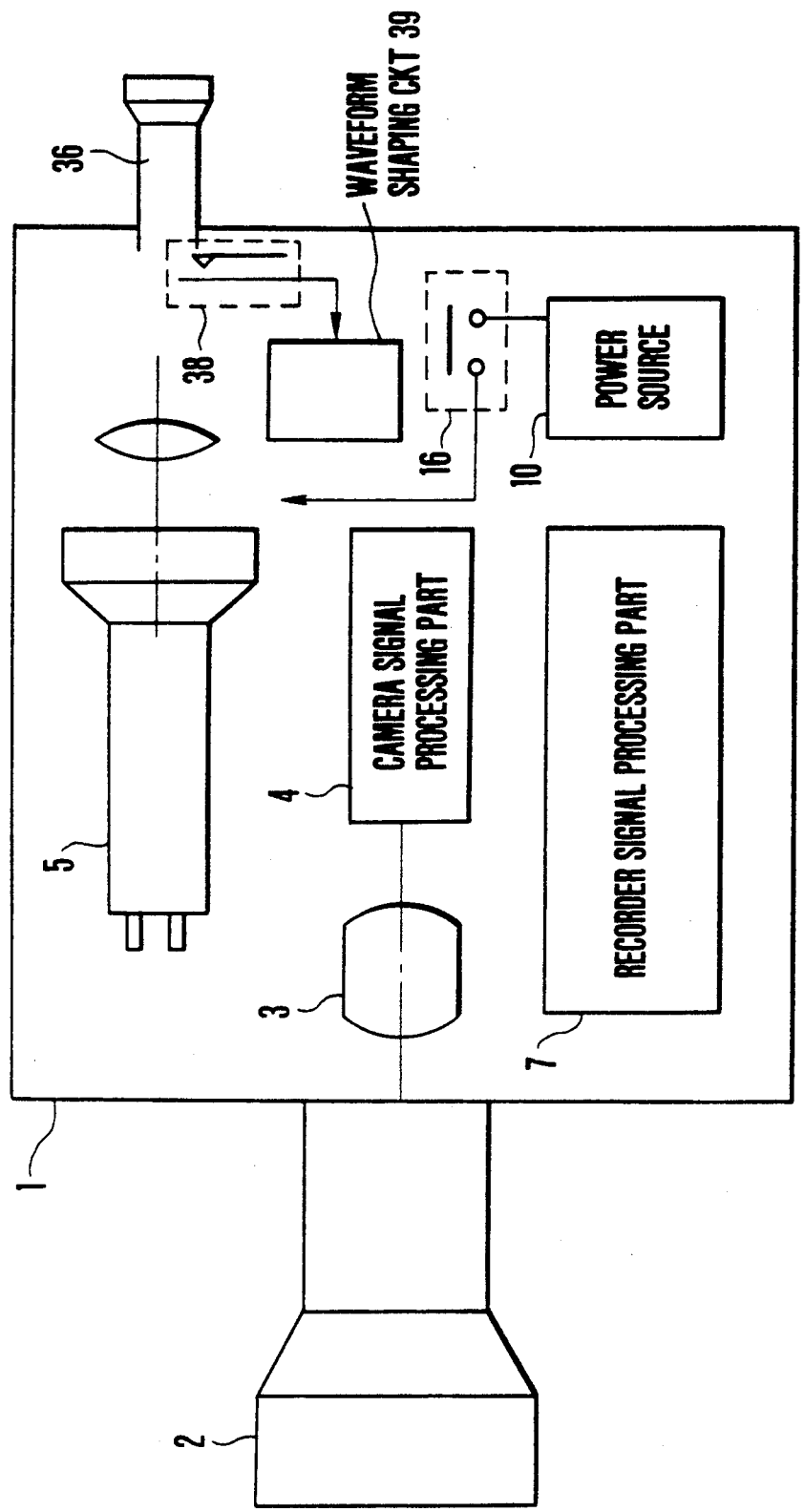

VIDEO CAMERA HAVING VIEWFINDER AND A POWER SAVING FUNCTION FEATURE

BACKGROUND OF THE INVENTION

1. Field of the Invention

This invention relates to a video camera and more particularly to a video camera which is arranged to permit confirmation of an object through a viewfinder.

2. Description of the Related Art

Photographers compose pictures to be taken by looking at the objects through viewfinders. However, unlike an optical camera or an electronic still camera, shooting with a video camera repeatedly alternates between a recording mode and a pause mode.

However, a person who is unaccustomed to shooting sometimes happens to unconsciously shoot the ground or some meaningless object without knowing that the camera actually remains in the recording mode while the camera is considered to be in the pause mode and thus wastes a tape, and electric energy as well, with the picture of an unwanted scene.

In other words, it has been a shortcoming of the conventional video camera that the tape and the electric energy tend to be wasted by a lengthy unintended shooting at the ground or some other meaningless scene.

SUMMARY OF THE INVENTION

Such being the background situation, it is an object of this invention to provide a video camera which is arranged to minimize unnecessary power consumption.

Under this object, a video camera which is arranged as an embodiment of this invention comprises image sensing means for converting an object image into a video signal; a viewfinder for visually showing the object image; detecting means for detecting a physical access of the body to the viewfinder; a power source; and control means for controlling the supply of electric power from the power source to the viewfinder according to an output of the detecting means.

It is another object of the invention to provide a video camera having a recorder which is arranged to generate no record of meaningless shooting.

Under that object, a video camera which is arranged as another embodiment of the invention comprises image sensing means for converting an object image into a video signal; a viewfinder for visually showing the object image; detecting means for detecting a physical access of the body to the viewfinder; a power source; recording means for recording the video signal on a recording medium; and control means for controlling the supply of electric power from the power source to the recording means according to an output of the detecting means.

These and further objects and features of the invention will become apparent from the following detailed description thereof taken in connection with the accompanying drawings.

BRIEF DESCRIPTION OF THE DRAWINGS

FIG. 8 is a block diagram showing the arrangement of the essential parts of a camera-integrated VTR which is arranged according to this invention as another embodiment thereof.

DETAILED DESCRIPTION OF THE PREFERRED EMBODIMENTS

Figure 1:
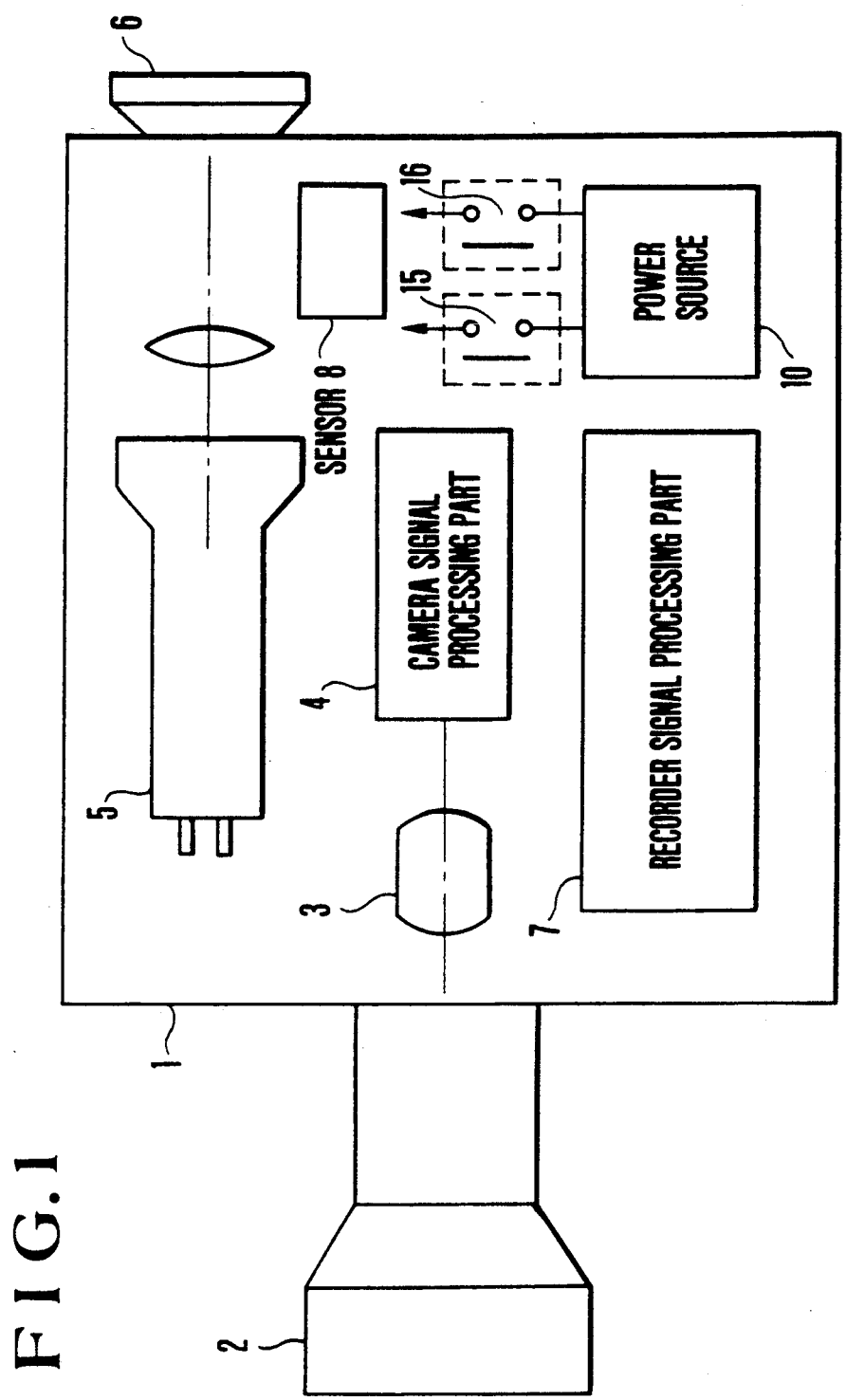
FIG. 1 is a block diagram showing the arrangement of the essential parts of a camera-integrated video tape recorder (VTR) which is arranged according to this invention as an embodiment thereof.
Figure 2:
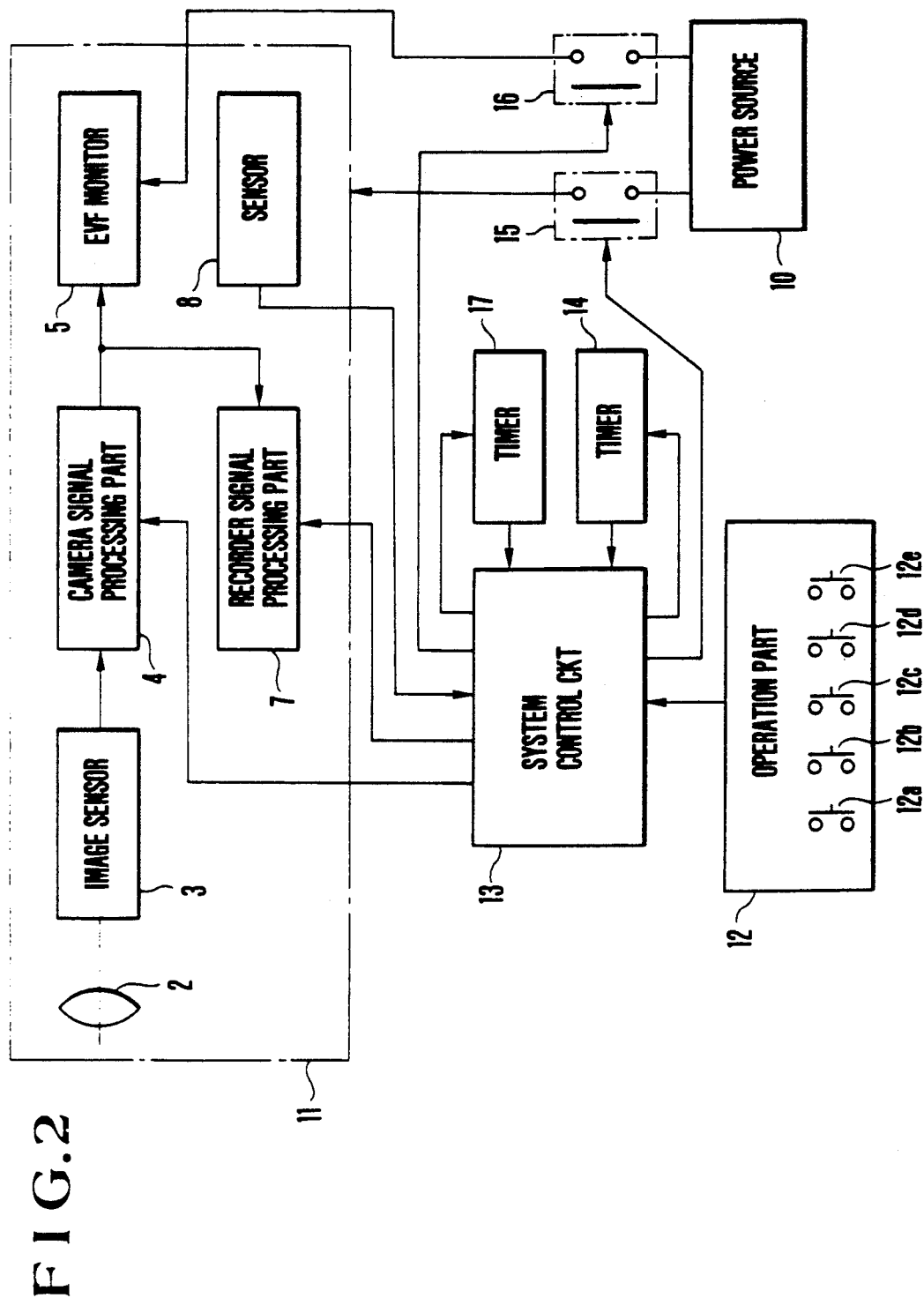
FIG. 2 is a block diagram showing the circuit arrangement of the same camera-integrated VTR.
Figure 3:
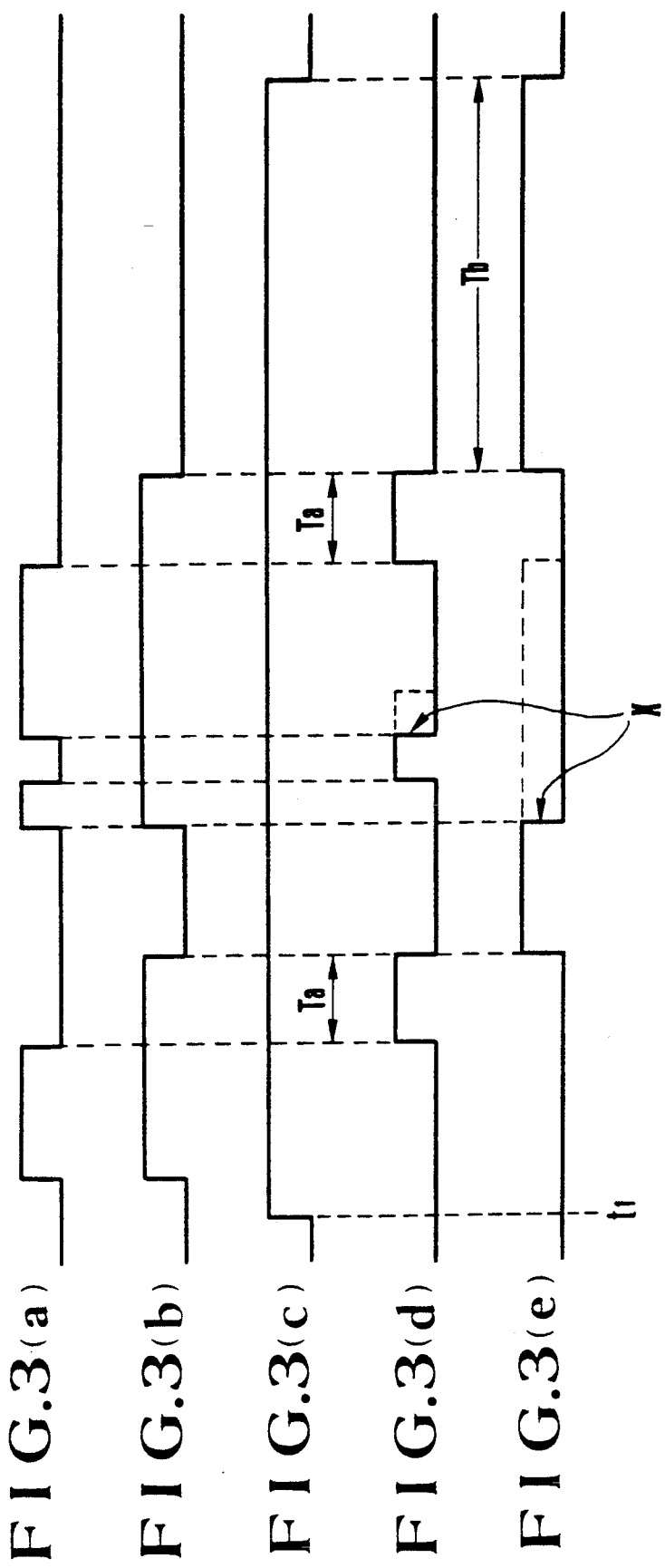
FIGS. 3 (a) to 3(e) show in a timing chart the operation of the camera-integrated VTR.

This invention is described below through some of the embodiments thereof;

FIG. 1 schematically shows the arrangement of the essential parts of a camera-integrated video tape recorder (VTR) which, is a first embodiment of this invention. FIG. 2 is a block diagram showing the circuit arrangement of the embodiment shown in FIG. 1.

Referring to FIGS. 1 and 2, a reference numeral 1 denotes the body of the camera-integrated VTR which is arranged as the first embodiment of the invention. The VTR comprises a photo-taking lens 2; an image sensor 3; a camera signal processing part 4; a display monitor 5 which forms an electronic viewfinder (hereinafter referred to as EVF); a viewfinder eyepiece part 6; a recorder signal processing part 7; a sensor 8 which senses a physical access of the body to the viewfinder eyepiece part 6, i.e., the access of the eye of a photographer to the viewfinder eyepiece part 6; and a power source 10.

A reference numeral 11 denotes the main part of the VTR. A numeral 12 denotes an operation part which is provided with a group of key switches for designating operation modes. The operation part 12 includes a trigger key 12a which performs switch-over between a recording mode (hereinafter referred to as REC mode) and a pause mode (hereinafter referred to as PAUSE mode); a reproduction key 12b which is provided for designating a reproduction mode; a stop key 12c which is provided for designating a stop mode; a manual switch 12d which is arranged to render the sensor 8 operative or inoperative; and a power supply switch 12e. A numeral 13 denotes a system control circuit which is arranged to control the operation of the whole camera-integrated VTR in accordance with instructions given from the above-stated operation part 12, and to shift the REC mode to the PAUSE mode according to information received from the sensor 8. A numeral 14 denotes a timer which is arranged to count a period of time elapsing after turning-off of a switch 16 which is arranged to switch over the supply of electric power from the power source 10 to the EVF monitor 5. A numeral 15 denotes a main switch which is arranged to switch over the supply of electric power from the power source 10 to the main part 11 of the VTR. A numeral 17 denotes a timer which is arranged to count a period of time elapsing after the sensor 8 has detected the cancellation of the access of the eye of a photographer to the eyepiece part 6.

FIGS. 3(a) to 3(e) show in a timing chart the operation of the camera-integrated VTR of this embodiment.

The action of the sensor 8 in relation to the on-off timing of the switches 15 and 16 is described with reference to FIGS. 3(a) to 3(e) as follows: FIG. 3(a) shows the on and off states of the sensor 8. FIG. 3(b) shows those of the switch 16. FIG. 3(c) shows those of the switch 15. FIG. 3(d) shows at a high level a given period of time Ta elapsing after the start of time count by the timer 17. FIG. 3(e) shows at a high level a given period of time Tb elapsing after the start of time count of the timer 14.

As apparent from FIGS. 3(a) to 3(e), in the case of the camera-integrated VTR of this embodiment, the timer 17 begins to count time when the sensor 8 has detected the cancellation of the access of the eye of a photographer to the eyepiece part 6, and the switch 16 is turned off to bring the power supply to the EVF monitor 5 to a stop when the time count has reached the given value Ta.

After the power supply to the EVF monitor 5 is brought to a stop, the timer 14 begins to count time, and, when the time count has reached the given value Tb, the switch 15 is turned off to bring the power supply to the main part 11 to a stop. Incidentally, in each of FIGS. 3(d) and 3(e), a reference symbol X denotes timing at which the timer 17 or 14 is reset by the output of the sensor 8 before the timer 17 or 14 counts up to the given value Ta or Tb.

Figure 4:
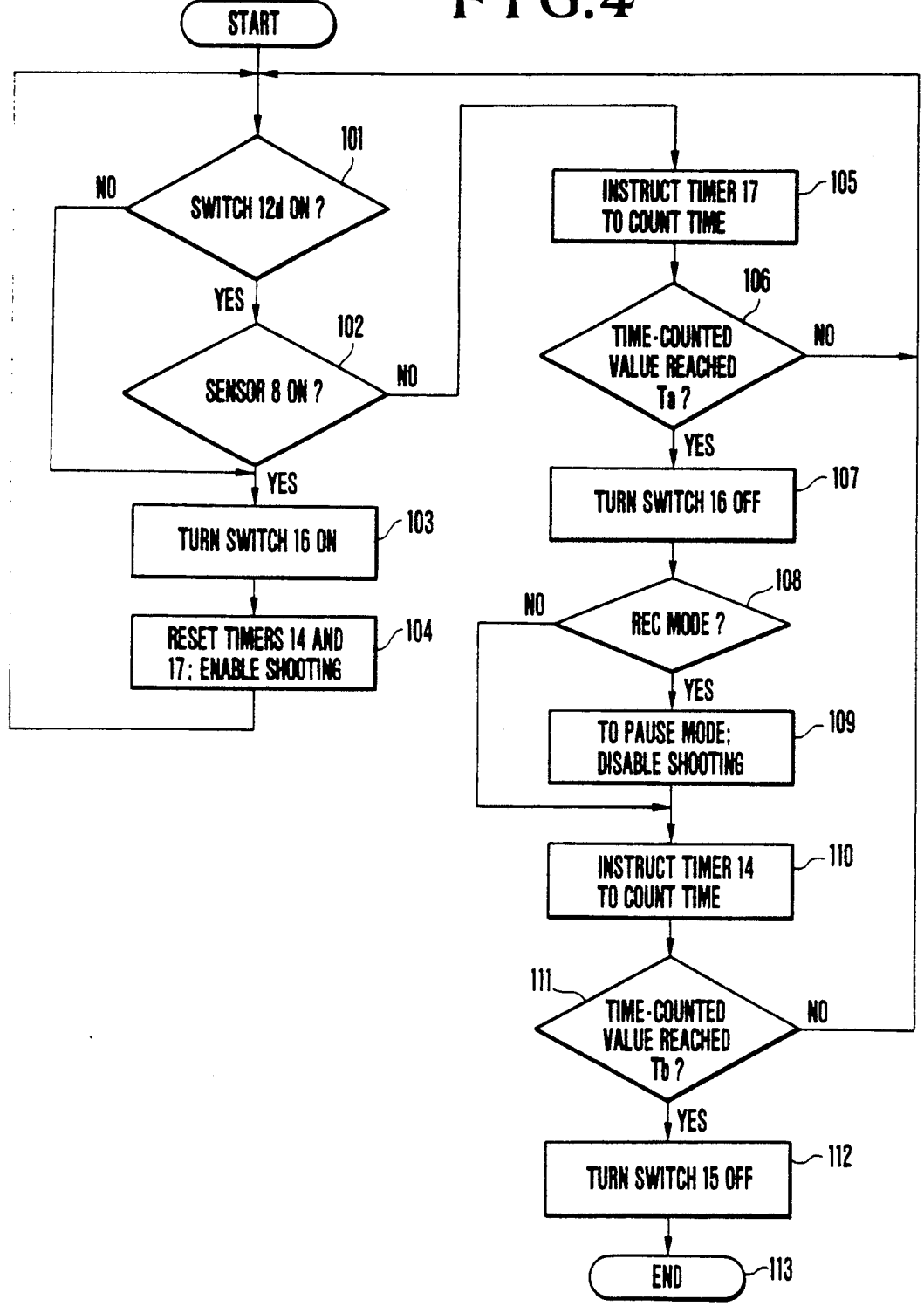
FIG. 4 is a flow chart showing the operation of a system control circuit included in the camera-integrated VTR of FIG. 1.

The operation of the system control circuit 13 for performing the above-stated operation of the VTR is described as follows with reference to FIG. 4 which is a flow chart;, The flow of operation starts when the power supply switch 12e is turned on. At a step 101, a check is made for the state of the manual switch 12d. If the manual switch 12d is in an on-state, the flow proceeds to a next step 102. If not, the flow comes to a step 103. In other words, if the switch 12d is found to be in an offstate when the power supply switch 12e is turned on, the flow comes to the step 103 to turn on the switch 16. With the switch 16 turned on, electric power from the power source 10 is supplied to the EVF monitor 5. At a step 104, the VTR is brought into a shootable state in which the operation of the trigger key 12a is acceptable for shooting.

In a case where the sensor 8 is in an on-state when the switch 12d is in an on-state, i.e., in a case where the access of the eye of a photographer to the eyepiece part 6 is detected, the VTR is also brought into the shootable state through the steps 103 and 104.

When the eye of a photographer comes away from the eyepiece part 6 after completion of shooting, the output of the sensor 8 shows an off-state at the step 102. In this instance, the flow comes to a step 105. At the step 105, the timer 17 is instructed to perform its time count action. The timer 17 begins to count time. At a step 106, a check is made to find if the time-counted value has reached the given value Ta. If not, the flow comes back to the step 101 and the time count is allowed to continue. However, in cases where the switch 12d is turned off or where the sensor 8 again turns on, the timer 17 is reset and the VTR comes back to the shootable state at the step 104.

If the time-counted value of the timer 17 is found to have come to exceed the given value Ta at the step 106, the flow proceeds to a step 107. At the step 107, the switch 16 is turned off to bring the power supply to the EVF monitor 5 to a stop. At a step 108, a check is made to find if the current mode of the VTR is the REC mode. If so, the flow comes to a step 109. At a step 109, the mode of the VTR is changed to the PAUSE mode, and the VTR is brought into an unshootable state in which the VTR cannot be shifted to the REC mode even if the trigger key 12a is operated.

At a step 110, the timer 14 is instructed to perform its time count action. The timer 14 then begins to count time. At a step 111, if the time-counted value of the timer 14 is found to be less than the given value Tb, the flow comes back to the step 101 to allow the timers 17 and 14 to continue their time count actions. If the time-counted value of the timer 14 is found to have come to exceed the given value Tb at the step 111, the flow comes to a step 112. At the step 112, the main switch 15 is turned off and the flow of operation comes to an end.

The arrangement described effectively prevents the EVF monitor 5 from unnecessarily consuming electric energy and also prevents useless shooting, so that the waste of the tape and electric energy can be minimized.

Figure 5:
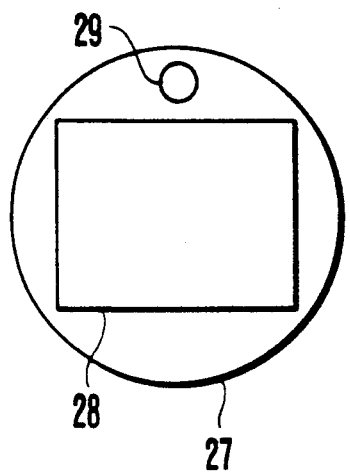
FIG. 5 shows by way of example the arrangement of a sensor shown in FIG. 1.

An example of arrangement of the sensor 8 of the above-stated embodiment is described as follows: FIG. 5 shows the location of the sensor 8 within the viewfinder of the camera-integrated VTR. The illustration includes a viewfinder body 27; a display plane 28; and a light receiving part 29 which is arranged to detect the access of the eye of a photographer when external light is blocked by the photographer and to produce an output signal.

Figure 6:
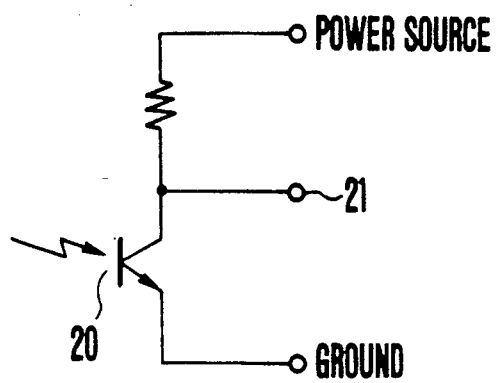
FIG. 6 is a circuit diagram showing by way of example the circuit arrangement of the same sensor.

FIG. 6 is a circuit diagram showing the circuit of the sensor 8 arranged when only the photo-sensor of the sensor 8 is disposed within the viewfinder as the light receiving part 29. The sensor 8 includes the photo-sensor 20 and an output terminal 21. The level of the output signal of the sensor 8 becomes high when the photographer looks into the viewfinder and becomes low when the external light comes to fall on the sensor 8 with the eye of the photographer moved away from the viewfinder.

Figure 7:
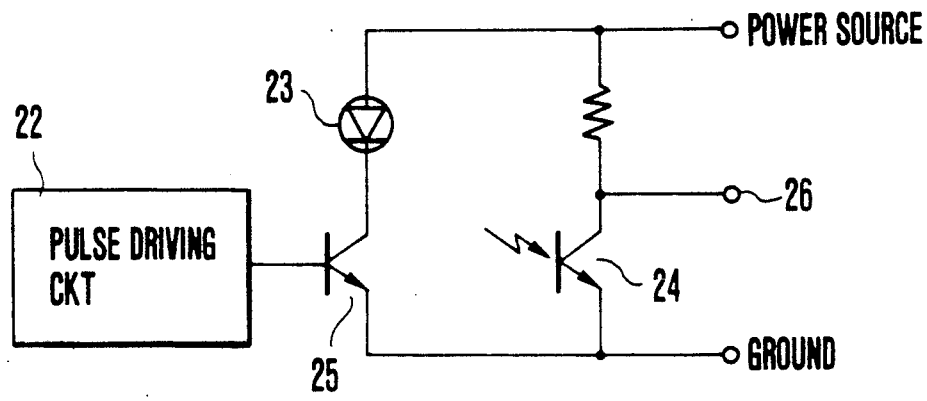
FIG. 7 is a circuit diagram showing another example of circuit arrangement of the same sensor.

In another example of arrangement of the sensor 8, a light projector and a light receiver are arranged in a pair. FIG. 7 is a circuit diagram of that example of the sensor 8 which includes the light projector and the light receiver. Referring to FIG. 7, the example includes a pulse driving circuit 22 which is arranged to intermittently drive a light emitting diode 23; the light emitting diode 23; a light receiving element 24; a transistor 25; and an output terminal 26 of the sensor. The level of the output signal of the sensor becomes high when the intermittent light emitted from the light emitting diode 23 is blocked by the photographer. The high-level signal is then supplied to the system control circuit 13 shown in FIG. 2 to allow the latter to operate as described above. The locations of the light projector and the light receiver are not limited to the inside of the viewfinder. They may be located in any positions where looking by the photographer into the viewfinder is detectable. Further, in the case of FIG. 7, any adverse effect of the external light can be eliminated by arranging the VTR to take out the output of the sensor on the light receiving side in synchronism with a pulse driving action on the light projector.

Further, it is possible to arrange a sport viewfinder which permits shooting with the eye located at a certain distance from the viewfinder by contriving to suitably locate the light projector and the light receiver even if the light projector is arranged in addition to the light receiver. Further, since the EVF monitor 5 begins to operate before the face of the photographer is pushed against the viewfinder eyepiece part 6, the invented arrangement is suited for a VTR using a viewfinder of the kind having a relatively long building-up time before visualizing a picture, such as in the case of a cathode-ray tube type display device.

FIG. 8 shows in outline the arrangement of a camera-integrated VTR which is arranged as a second embodiment of this invention. In FIG. 8, the same component parts as those of the first embodiment shown in FIG. 1 are indicated by the same reference numerals. The VTR (the second embodiment) shown in FIG. 8 differs from the VTR of FIG. 1 (the first embodiment) in the following points: A movable viewfinder eyepiece part 36 and a detection switch 38 which detects that the eye of the photographer gains access to and is pushed against the eyepiece part 38 are arranged in place of the sensor 8 of the first embodiment. Further, a waveform shaping circuit 39 is arranged to absorb the chattering of this switch 38, etc. The output of the waveform shaping circuit 39 is arranged to be handled in the same manner as that of the sensor 8 of the first embodiment shown in FIGS. 1 to 4.

As described in the foregoing, in accordance with this invention, a detecting means is arranged to detect looking into the viewfinder by the photographer. The detecting means produces a signal when the looking action is detected. In cases where the signal is not output from the detecting means over a given period of time, the power supply from the power source to the viewfinder device is automatically cut off. Therefore, the electric energy can be saved from being wasted.

It is further arranged such that, if the signal of the detecting means is still not received for a further given period of time after the power supply from the power source to the viewfinder device is cut off, the main power supply is also automatically cut off. This arrangement effectively prevents the power supply switch from not being turned off owing to an oversight.

Further, in accordance with this invention, when a camera-integrated recorder is not in use while it is unconsciously left in its recording mode, the recorder is automatically shifted to a pause mode i the photographer is then not looking into the viewfinder for a predetermined period of time. This effectively prevents inadvertent shooting at unwanted scenes while it was forgotten to shift the recording mode.

Therefore, the invention not only saves the electric energy but also enables the photographer to take the picture of desired scenes only, thus preventing the recording medium from being wasted.

As will be particularly appreciated from FIG. 2, the connection of power source 10 through switch 15 is at large to main VTR part 11, which is inclusive of image sensor 3, monitor 5 and camera and recorder signal processing parts 4 and 7. Accordingly, it is to be understood that the invention looks, on the occurrence of the detected condition of nonuse of the monitor 5, to the cutoff of power, separately or in combination, to the various components of the main VTR part 11, i.e., the monitor 5, the image sensor 3 and the processing parts 4 and 7.

What is claimed is:

1. A video camera comprising:
  a) image sensing means for converting an object image into a video signal;
  b) recording means for recording said video signal on a recording medium;
  c) a viewfinder for visually showing the object image;
  d) detecting means for detecting a physical non-access of a user to said viewfinder;
  e) a power source; and
  f) control means having a first control function for controlling the supply of electric power from said power source to said viewfinder according to an output of said detecting means and a second control function for controlling a recording action of said recording means according to the output of said detecting means, said control means being arranged to start the operation of said second control function after starting of the operation of said first control function.

2. A video camera according to claim 1 wherein said detecting means includes a timer for counting a period of time for which non-access to the user to said viewfinder is indicated.

3. A video camera according to claim 1, wherein said first control function is to inhibit the supply of electric power from said power source to said viewfinder and said second control function is to inhibit the recording action of said recording means.

4. A video camera according to claim 1, wherein said control means includes a third control function for controlling the supply of electric power from said power source to said image sensing means according to an output of said detecting means, said control means being arranged to provide a difference in time between an operation starting timing of said third control function and those of said first and second control functions.

5. A video camera according to claim 4, wherein the operation starting timing of said third control function is later than the operation starting timings of said first and second control functions.

6. A video camera according to claim 1, wherein said detecting means includes a switching element arranged to detect a movement of an eyepiece pat of said viewfinder.

7. A video camera comprising:
  a) image sensing means for converting an object image into a video signal;
  b) a viewfinder for visually showing the object image;
  c) detecting means for detecting a physical non-access of a user to said viewfinder;
  d) a power source; and
  e) control means having a first control function for controlling the supply of electric power to said viewfinder according to an output of said detecting means and a second control function for controlling the supply of electric power to said image sensing means, said control means being arranged to provide a deference in time between an operation starting timing of said first control function and that of said second control function.

8. A video camera according to claim 5, wherein said first control function is to inhibit the supply of electric power from said power source to said viewfinder and said second control function is to inhibit the supply of electric power from said power source to said image sensing means.

9. A video camera according to claim 7, wherein the operation starting timing of said first control function is earlier than the operation starting timing of said second control function.

10. A video camera according to claim 7, wherein said detecting means includes a switching element arranged to detect the movement of an eyepiece part of said viewfinder.

11. A video camera comprising:
 a) image sensing means or converting an object image into a video signal;
 b) recording means for recording said video signal on a recording medium;
 c) a viewfinder for visually showing the object image;
 d) detecting means for detecting a physical non-access of a user to said viewfinder;
 e) a power source; and
 f) control means having a first control function for controlling a recording action of said recording means according to the output of said detecting means and a second control function for controlling the supply of electric power from said power source to said image sensing means according to an output of said detecting means, said control means being arranged to provide a difference in time between an operation starting timing of said first control function and that the of said second control function.

12. A video camera according to claim 11, wherein said detecting means includes a timer for counting a period of time for which non-access of the user to said viewfinder is indicated.

13. A video camera according to claim 11, wherein said first control function is to inhibit the recording action of said recording means and said second control function is to inhibit the supply of electric power from said power source to said image sensing means.

14. A video camera according to claim 11, wherein the operation starting timing of said second control function is later than the operation starting timing of said first control function.

15. A video camera comprising:
 a) image sensing means for converting an object image into a video signal;
 b) a viewfinder for visually showing the object image;
 c) detecting means for detecting a physical access of a user for looking into said viewfinder, said detecting means including a switching element arranged to detect the movement of an eyepiece part of said viewfinder;
 d) a power source;
 e) recording means for recording the video signal on a recording medium; and
 f) control means or controlling the supply of power from said power source to said recording means according to an output of said detecting means.

* * * * *

UNITED STATES PATENT AND TRADEMARK OFFICE
CERTIFICATE OF CORRECTION

PATENT NO.   :   5,313,305
DATED        :   May 17, 1994
INVENTOR(S)  :   Isao Harigaya, et al It is certified that error appears in the above-indentified patent and that said Letters Patent is hereby corrected as shown below:

On the title page,

Insert, --[30] Foreign Application Priority Data
   June 28, 1990 [JP] Japan 02-168325
   June 28, 1990 [JP] Japan 02-168326

Col. 2 line 20, change ";," to --.--

Col. 3 line 30, change ";," to --.--

Col. 5 line 42, change "i" to -- if--

Col. 6 line 54, change "deference" to --difference--

Signed and Sealed this

Tenth Day of January, 1995

Attest:

BRUCE LEHMAN

Attesting Officer

Commissioner of Patents and Trademarks